(12) United States Patent
Link et al.

(10) Patent No.: US 8,717,637 B2
(45) Date of Patent: May 6, 2014

(54) METHOD FOR SCANNING DOCUMENTS

(75) Inventors: Bruce A. Link, Rochester, NY (US);
George E. Lathrop, Dansville, NY (US)

(73) Assignee: Kodak Alaris Inc., Rochester, NY (US)

( * ) Notice: Subject to any disclaimer, the term of this patent is extended or adjusted under 35 U.S.C. 154(b) by 202 days.

(21) Appl. No.: 13/307,447

(22) Filed: Nov. 30, 2011

(65) Prior Publication Data

US 2013/0135687 A1 May 30, 2013

(51) Int. Cl.
*H04N 1/04* (2006.01)

(52) U.S. Cl.
USPC ........... 358/474; 358/449; 358/488; 358/494; 358/498; 399/367; 399/370; 399/372

(58) Field of Classification Search
None
See application file for complete search history.

(56) References Cited

U.S. PATENT DOCUMENTS

| | | | |
|---|---|---|---|
| 5,640,647 A * | 6/1997 | Hube | 399/84 |
| 6,233,425 B1 * | 5/2001 | Ohkubo et al. | 399/366 |
| 6,370,277 B1 | 4/2002 | Borrey | |
| 6,520,498 B2 | 2/2003 | Phinney | |
| 6,913,259 B2 | 7/2005 | Phinney | |
| 7,336,404 B2 * | 2/2008 | Benham | 358/488 |
| 8,264,752 B2 * | 9/2012 | Katsuyama | 358/498 |
| 2002/0054335 A1 | 5/2002 | Sekiguchi | |
| 2009/0067729 A1 * | 3/2009 | Turkelson et al. | 382/224 |
| 2010/0328734 A1 | 12/2010 | Okada | |
| 2011/0279849 A1 | 11/2011 | Umi | |
| 2011/0292434 A1 | 12/2011 | Lim | |
| 2012/0019874 A1 * | 1/2012 | Schaertel et al. | 358/474 |
| 2013/0094065 A1 * | 4/2013 | Pultorak | 358/443 |

FOREIGN PATENT DOCUMENTS

| | | |
|---|---|---|
| EP | 0 711 062 | 5/1996 |
| EP | 0 766 449 | 4/1997 |
| JP | 2010 157916 | 7/2010 |
| WO | 2010/144526 A1 | 12/2010 |
| WO | 01/64229 | 6/2011 |

* cited by examiner

*Primary Examiner* — Dung Tran
(74) *Attorney, Agent, or Firm* — Hogan Lovells US LLP

(57) ABSTRACT

A method for scanning documents in a document scanner (10) includes transporting (45) documents from an input tray (20) to an document detection sensor (135A-135E); detecting documents with the document detection sensor; capturing image data for a document with an image capture device; determining characteristics of the document based on the image data with an image processor; comparing characteristics of the document to document detection sensor data; and excluding document detection sensor data which conflicts with the image data.

8 Claims, 5 Drawing Sheets

METHOD FOR SCANNING DOCUMENTS

CROSS REFERENCE TO RELATED APPLICATIONS

Reference is made to commonly-assigned copending U.S. patent application Ser. No. 13/307,406, filed Nov. 30, 2011, entitled DOCUMENT SCANNER, by Link et al.; U.S. patent application Ser. No. 13/272,599, filed Oct. 13, 2011, entitled DETERMINING DOCUMENT CHARACTERISTICS PRIOR TO SCANNING, by Pultorak; and U.S. patent application Ser. No. 13/272,616, filed Oct. 13, 2011, entitled A DOCUMENT SCANNER, by Pultorak; the disclosures of which are incorporated herein.

FIELD OF THE INVENTION

This invention relates to extracting properties of documents fed through a document scanner from an input tray by combining imaging data from an image capture device with the machine control document detection sensors to automate the scanner setup, functionality, and behavior.

BACKGROUND OF THE INVENTION

A document scanner moves a document from an input tray, through a transport path and creates an image of the document as it moves past a stationary imaging capture device such as a charge coupled device (CCD) or CIS. Sensors in the transport are used to make sure the document enters the transport correctly. Depending on the type of document or document characteristics, the operator must select functions and features to optimize the scanner to accommodate the specific requirements for a particular document.

A document scanner includes an input tray for holding documents. A transport system picks the top-most document from the input tray and moves it past one or more document detection sensors as well as an image capture device which acquires an image of the document being scanned on its way to the output tray. The image captured is stored in a buffer memory which is analyzed by an image processor.

The image processor determines characteristics of documents being scanned, and the documents are processed based on the characteristics. The document characteristic may include the document length, width, position, color, type, or condition of the document. Document detection sensors such as ultrasonic sensors can be used to detect multiple documents fed into the transport at the same time. By combining the ultrasonic data with the characteristics obtained from the document's image data, an accurate correlation can be made to determine which zone or zones should be used or ignored and which ultrasonic sensor data should be excluded or included during further processing of at least one location within the document based on at least one characteristic.

In a document scanner, the documents to be scanned may vary by size, weight, color content, physical condition, or other characteristics, which may require different scanner features to be enabled or operator actions to be employed for the most optimal and efficient mode of operation. Since the scanner is not typically programmed with specific requirements on a document-by-document basis, the user may default the scanner to a less efficient set of settings that will process all documents within a batch. Alternately, the operator may manually sort the documents based on common document characteristics. Documents could be sorted based on document characteristics, such as length, width, weight, color, physical condition, or document type.

Prior art, such as commonly-assigned U.S. patent application Ser. No. 13/272,616, accomplishes this by adding an external image device to the input tray. This method adds additional cost and complexity by adding additional circuitry to support the external camera. In addition since the document is imaged before it enters the transport, any document skew, shifting or slippage due to the feed roller introduces error that is difficult to correct for after the document has move into the transport. Additionally, mischaracterization of the top-most document's length and size due to the inability to disassociate this document from others in the stack can lead to subsequent document classification scanning errors.

Knowledge of these many different document characteristics can enable the proper selection of scanner features to improve the efficiency of the scanning process or enable other features which may provide specific applications required by a particular type, style, or size of document. There is a need, therefore, for detection of document characteristics to optimize the operation of the scanner.

SUMMARY OF THE INVENTION

Briefly, according to one aspect of the present invention a method for scanning documents in a document scanner includes transporting documents from an input tray to an document detection sensor; detecting documents with the document detection sensor; capturing image data for a document with an image capture device; determining characteristics of the document based on the image data with an image processor; comparing characteristics of the document to document detection sensor data; and excluding document detection sensor data which conflicts with the image data.

The present invention eliminates the need for the operator of the scanner to manually enable or disable the one or more document detection sensors based on the input documents and solves the problem of false detection of multi-feeds based on holes in the document or document detection sensors being partially covered by the document. The present invention handles irregular shaped documents where the edge of the document may cross a document detection sensors multiple times.

The present embodiment uses existing scanner circuitry. Since it uses the actual scanned image data, any document shifting or skew due to the transport feed rollers has already occurred before the document is imaged. Therefore this method accounts for any document shift or skew and can ignore (enable/disable) document detection sensor data within a document to filter out the times when a detection sensor is partially covered either by the end or edge of the document or by a hole in the document thereby maximizing the use of the document detection sensor data over the usable regions of the document. Once the questionable document detection sensor data is ignored, the image processing analysis can correlate document characteristics with the remaining valid data. When a multi-feed is detected, a message is forwarded to cause the desired action; otherwise the document will be processed normally without exception.

The invention and its objects and advantages will become more apparent in the detailed description of the preferred embodiment presented below.

DETAILED DESCRIPTION OF THE INVENTION

The present invention will be directed in particular to elements forming part of, or in cooperation more directly with the apparatus in accordance with the present invention. It is to be understood that elements not specifically shown or described may take various forms well known to those skilled in the art.

Figure 1:
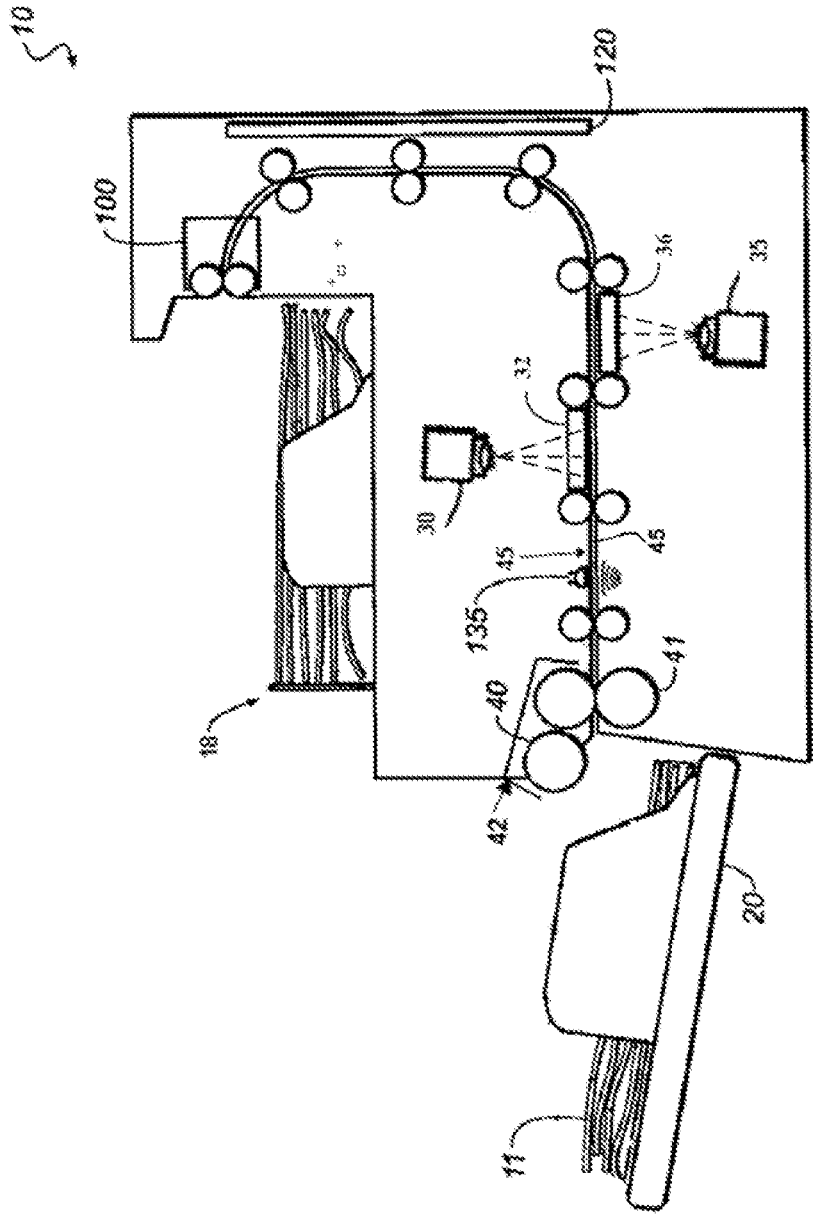
FIG. 1 is a cross-section view of the side of a document scanner which illustrates the various parts of the scanner related to the present invention.

FIG. 1 is a side cross-sectional view of a document scanner 10. The illustration shows the input tray 20 with document 11 waiting to be scanned by the scanner. A typical scanner also has a transport 45 for moving documents through the scanner and an output tray 18 for collecting documents as well as other components that makeup a document scanner.

As shown in FIG. 1, documents are first placed in the input tray 20 of the scanner. The feed roller 40 within the feed module 42 selects and pulls top document 11 from the input tray 20 into the transport 45. At the same time top document 11 moves into the transport 45, the document in contact below top document 11 may also move forward but is prevented from entering the transport by the separator roller 41. However, sometimes the document directly below top document 11 is pulled into the transport due, for example, to static.

As top document 11 travels through the transport 45, it passes document detection sensors 135A-135E, top imaging aperture 32 and the bottom imaging aperture 36. The top imaging device 30 images the document as it passes the top imaging aperture 32 while bottom imaging device 35 images the document as it passes the bottom imaging aperture 36. As sensor data from the document detection sensors 135A-135E and the image data from the top imaging device 30 and bottom imaging device 35 are captured, they are transmitted to be processed by a processor shown schematically as processing block 120.

The processing block 120 processes the image data, to determine document characteristics. These characteristics will be temporally combined with the document detection sensors 135A-135E data to enable or disable a particular feature or operation of the scanner based on the document characteristics.

Figure 2:
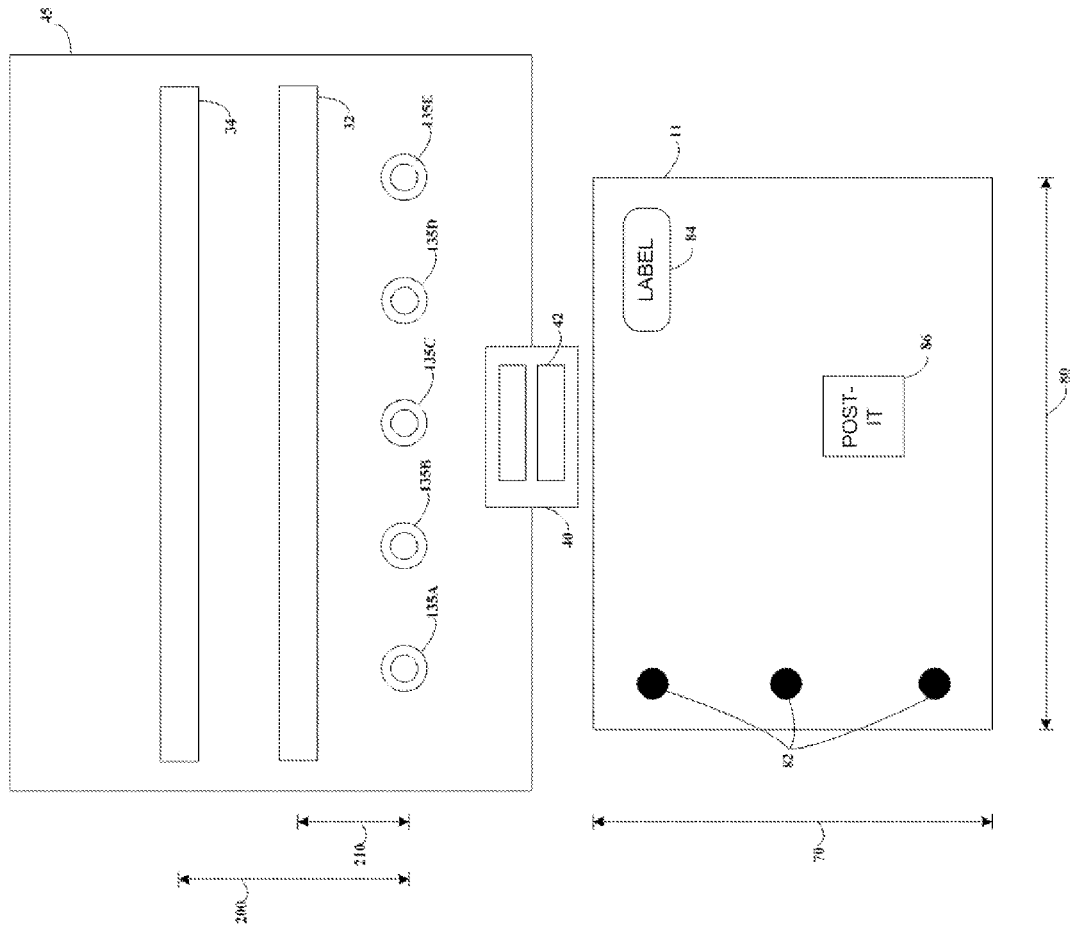
FIG. 2 is a perspective view of the scanner transport and illustrates various documents characteristics.

Within FIG. 2 is a perspective view of the scanner transport which illustrates various documents characteristics. Some document characteristics that are important in processing the document in regards to corresponding the document detection sensing data are the document length 70, width 80, holes 82 in the document or adhesive label 84 or stick on note 86 on the document. With regards to the transport, the physical document detection sensor to top aperture distance 200 and the document detection sensor to bottom aperture distance 210 are required for properly temporal synchronization of the digital image data 310 (in FIG. 3) and digital sensor data 375 (FIG. 3).

Figure 3:
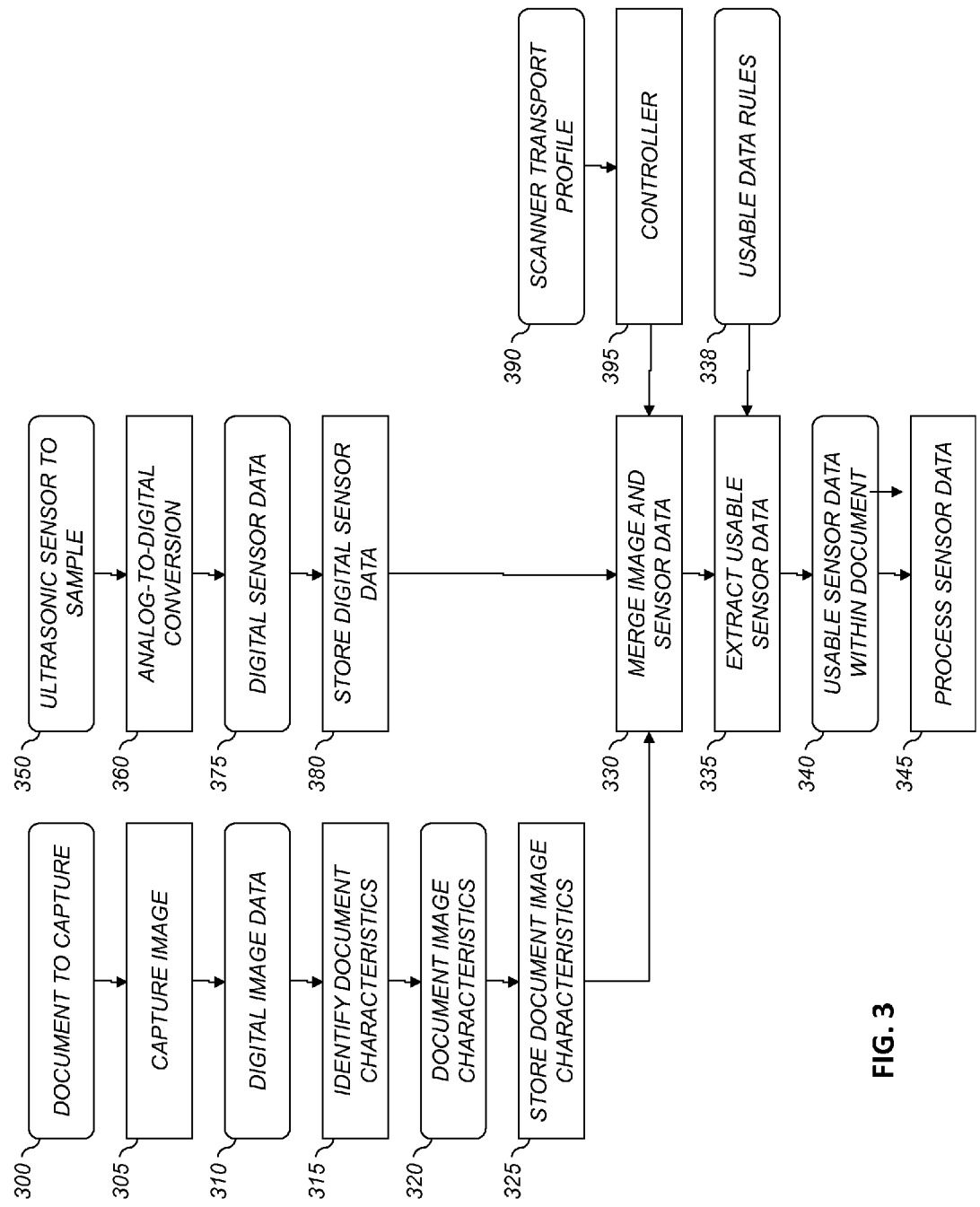
FIG. 3 is a flow diagram depicting a processing system in accordance with an embodiment of the invention.

In considering the flow diagram within FIG. 3, the image data and document detection sensor data captured is sent to the processing block 120 to be processed. The scanner process consists of a document to capture 300 (top document 11 in FIG. 1 and FIG. 2), which can be a text document, photograph, or some combination thereof; a capture image 305 step which consists of an imaging device which focuses light from the document to capture 300 onto an imaging sensor (not shown), for example, a single-chip color CCD or CMOS image sensor, and a Analog-to-Digital (A/D) converter, to produce digital image data 310. The digital image data 310 is processed by the identify document characteristics 315 step which will determine the length 70 and width 80 of the document, along with the location of the top document 11 boundaries. In addition the identify document characteristics 315 step will look within the document boundaries for additional characteristics such as holes 82, adhesive label 84 or stick on note 86. These document characteristics including their locations will be saved to buffer memory during the store document image characteristics 325 step. At the same time, the document detection sensor to sample 350 is being sampled by the analog-to-digital conversion 360 step to produce digital sensor data 375, which is saved during the store digital sensor data 380 step.

The scanner transport profile 390 consists of scanner transport parameters such as document detection sensor to top aperture distance 200 (FIG. 2) and document detection sensor to bottom aperture distance 210. The controller 395 will determine when the feed roller 40 (FIG. 1) is enabled to start to bring the top document 11 into the transport 45.

It will be understood that the functions of the controller 395 can be provided using a single programmable processor or by using multiple programmable processors, including one or more digital signal processor (DSP) devices. Alternatively, the controller 395 can be provided by custom circuitry (e.g., by one or more custom integrated circuits (ICs) designed specifically for use in digital scanners), or by a combination of programmable processor(s) and custom circuits.

The controller 395 will use the document detection sensor to top aperture distance 200 and document detection sensor to bottom aperture distance 210 along with the speed of the transport motors to determine when the lead-edge of the document reaches the document detection sensors 135A-135E, the top imaging aperture 32, and the top imaging aperture 36. Knowing this timing, the location of the stored sample data of top document 11 within the buffer memory used by the store document image characteristic 325 step and digital sensor data 375 within the buffer memory of the store digital sensor data 380 step can be identified. Knowing these temporal locations and the sampling rate of the analog-to-digital conversion 360 step and the sampling rate of the capture image 305 step, the offset in memory can be calculated to merge the digital sensor data 375 and the document image characteristics 320 during the merge image and sensor data 330 step.

Figure 4:
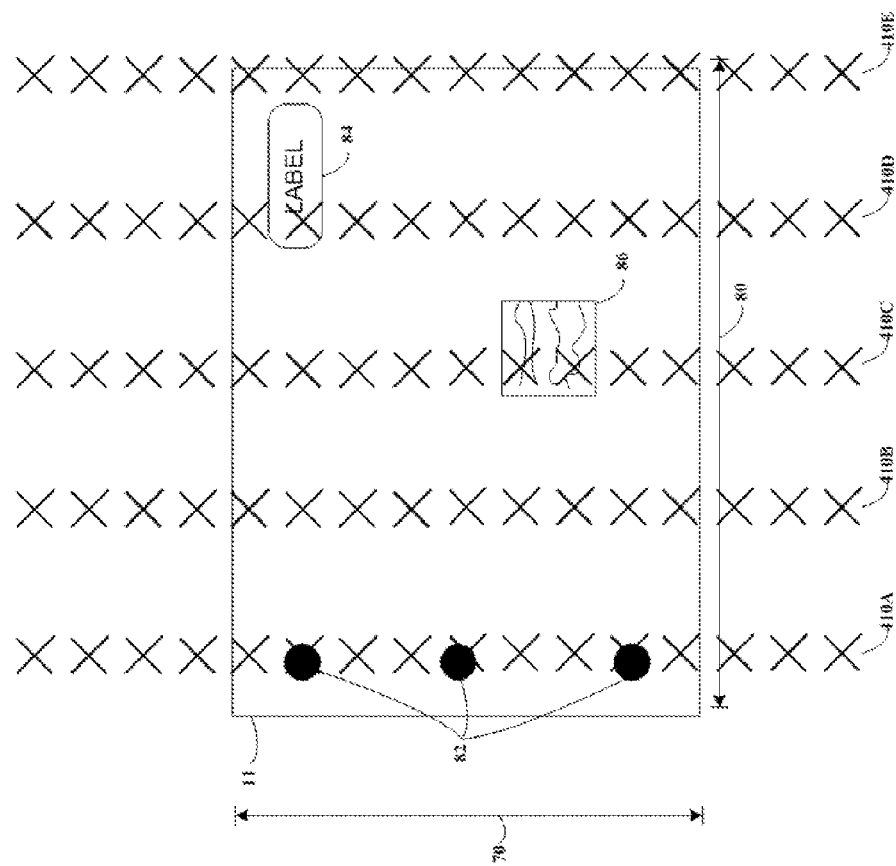
FIG. 4 is a pictorial view of a document with its characteristics and temporal in a transport relative to document detection samples as the document travels through the transport before processing.

FIG. 4 shows a pictorial view of merged and temporally aligned digital image data 310 and digital sensor data 375 that result from the merge image and sensor data 330 step. The document characteristics and position in a transport relative to document detection samples 410A, 410B, 410C, 410D and 410E are shown. In this embodiment, the document characteristics are, but not limited to the width 80, length 70, holes 82, adhesive label 84 and stick on note 86.

A set of usable data rules 338 (FIG. 3) are applied during the extract usable sensor data 335 step and determine what sensor data shall be used and what sensor data shall be excluded. For example, to determine if the feed roller 40 pulled in multiple documents into the transport 45, only sensor data that falls inside of the document's boundaries is included. Since the sensor data from the document detection sensors 135A-135E can produce false readings when the sensor partially falls on a document, this data can also be excluded during the extract usable sensor data 335 step (FIG. 3) to reduce the likelihood of a false detection. In the FIG. 4, this would include the document detection sensor sample 410E that is taken along the boundary of top document 11. In addition, the document detection sensor samples 410A are sometimes temporally taken over holes 82. The sensor sample at these locations can also be likewise excluded.

In some circumstances, the operator may want to consider top document 11 with a stick on label 86 on it as a multi-feed error while considering adhesive label 84 on top document 11 as not being a multi-feed error. In this situation the document detection sensor sample 410D that are temporally located over the adhesive label 84 are excluded while keeping the document detection sensor sample 410C that are temporally located over the stick on label 86 are not excluded.

In other embodiments, additional information from the top imaging device 30 and bottom imaging device 35 could be different. For example, the front could be configured to exclude document detection sensor samples over adhesive label 84 while including those corresponding samples located at the adhesive label 84 on the rear side of the document.

The color content from the top document 11 can also be used to define how the samples from the document detection sensors 135A-135E are used. For example, the color of a document characteristic can be used to exclude or include document detection sensing in the area of a specific the document characteristic. In this example the document detection sensor sample 410A-410E over a red stick on note 86 could be excluded while allowing document detection sensor sample 410A-410E over a yellow stick on note 86.

Figure 5:
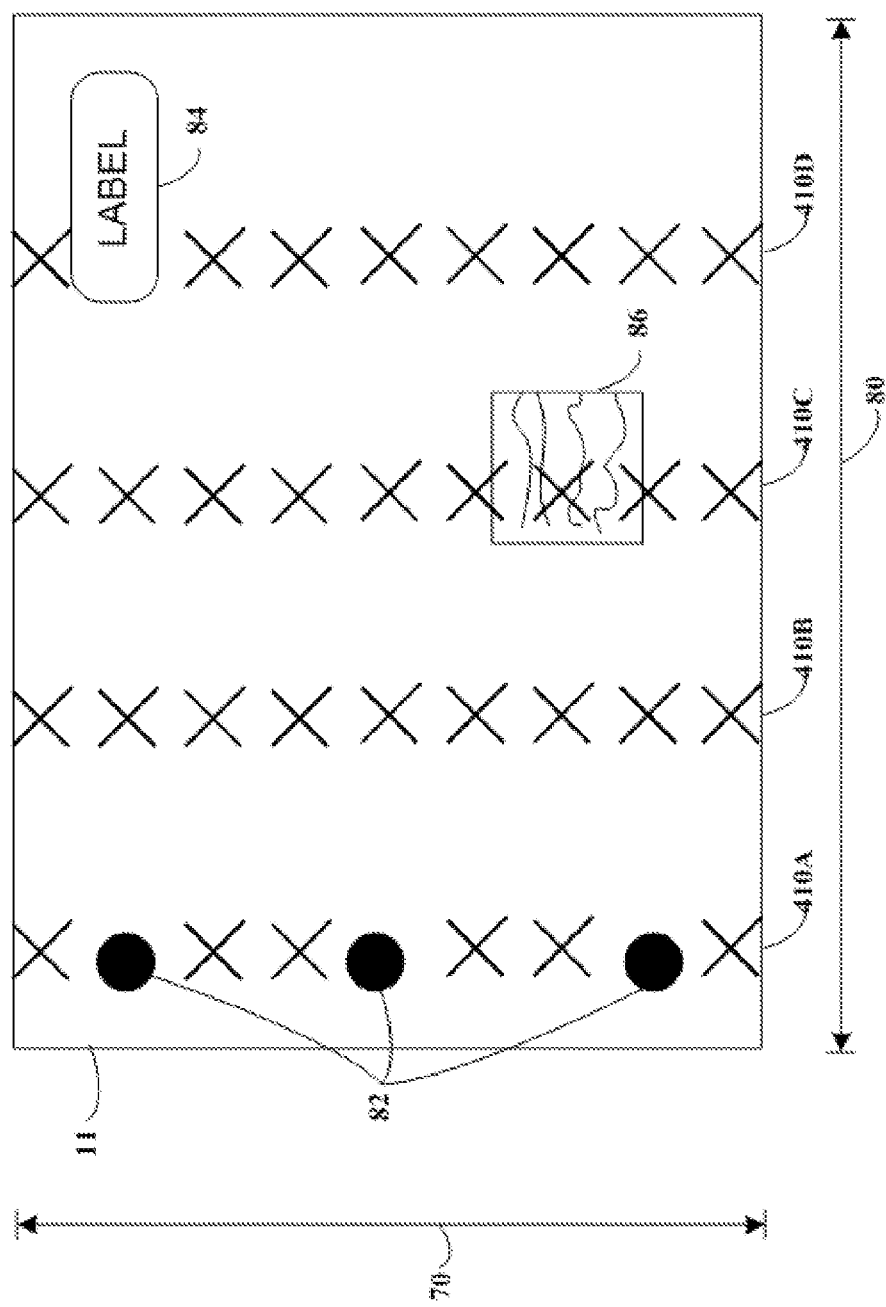
FIG. 5 is a pictorial view of a document with its characteristics and temporal in a transport relative to document detection samples as the document travels through the transport after processing.

Once the extract usable sensor data 335 step (FIG. 3) has been completed, only usable document detection sensor data within the document 340 remains which is then used in the process sensor data 345 step. FIG. 5 shows the digital sensor data 375 that is actually used by the process sensor data step 345.

In other embodiments, the document characteristics could be used to control the output rollers 100 for controlled stacking or sorting. For example, document of certain size or type such as checks, could be routed or sorted into a different output tray 18 by changing the path top document 11 takes with the transport 45 or by changing the speed of the output rollers 100. Still in other embodiments, documents that fall outside of an operator's defined set of parameters or exceptions during the process sensor data 345 step could be held at the output rollers 100 for easy access by the operator.

The invention has been described in detail with particular reference to certain preferred embodiments thereof, but it will be understood that variations and modifications can be effected within the scope of the invention.

PARTS LIST

| | |
|---|---|
| 10 | scanner |
| 11 | top document |
| 18 | output tray |
| 20 | input tray |
| 30 | top imaging device |
| 32 | top imaging aperture |
| 35 | bottom imaging device |
| 36 | bottom imaging aperture |

-continued

PARTS LIST

| | |
|---|---|
| 40 | feed roller |
| 41 | separation roller |
| 42 | feed module |
| 45 | transport |
| 70 | document length |
| 80 | document width |
| 82 | holes |
| 84 | adhesive label |
| 86 | stick on note |
| 100 | output rollers |
| 120 | processing block |
| 135A-135E | document detection sensor |
| 200 | document detection sensor to top aperture distance |
| 210 | document detection sensor to bottom aperture distance |
| 300 | document to capture |
| 305 | capture image step |
| 310 | digital image data |
| 315 | identify document characteristics step |
| 320 | document image characteristics |
| 325 | store document image characteristics step |
| 330 | merge image and sensor data step |
| 335 | extract usable sensor data step |
| 338 | usable data rules |
| 340 | usable sensor data within document |
| 345 | process sensor data step |
| 350 | document detection sensor to sample |
| 360 | analog-to-digital conversion step |
| 375 | digital sensor data |
| 380 | store digital sensor data step |
| 390 | scanner transport profile step |
| 395 | controller step |
| 410A-410E | document detection sensor sample |

The invention claimed is:

1. A method for scanning documents in a document scanner comprising:

transporting documents from an input tray of the document scanner to a document detection sensor located inside the document scanner;

detecting documents with the document detection sensor;

capturing image data for a document with an image capture device located along the document transport path inside the document scanner;

determining characteristics of the document based on the image data with an image processor;

merging the determined characteristics of the document with document detection sensor data; and excluding document detection sensor data which conflicts with the image data.

2. The method of claim 1 wherein at least one characteristic is document length or width or position.

3. The method of claim 1 wherein at least one of the characteristics is holes in the document or labels on the document.

4. The method of claim 1 wherein the image capture device is a linear sensor.

5. The method of claim 1 wherein the document detection sensor is an ultrasonic sensor.

6. The method of claim 1 comprising:

synchronizing incoming document detection data with incoming image data in an image buffer.

7. The method of claim 1 wherein the image capture device is a color sensor.

8. The method of claim 7 wherein the documents are processed according to color.

* * * * *